United States Patent Office

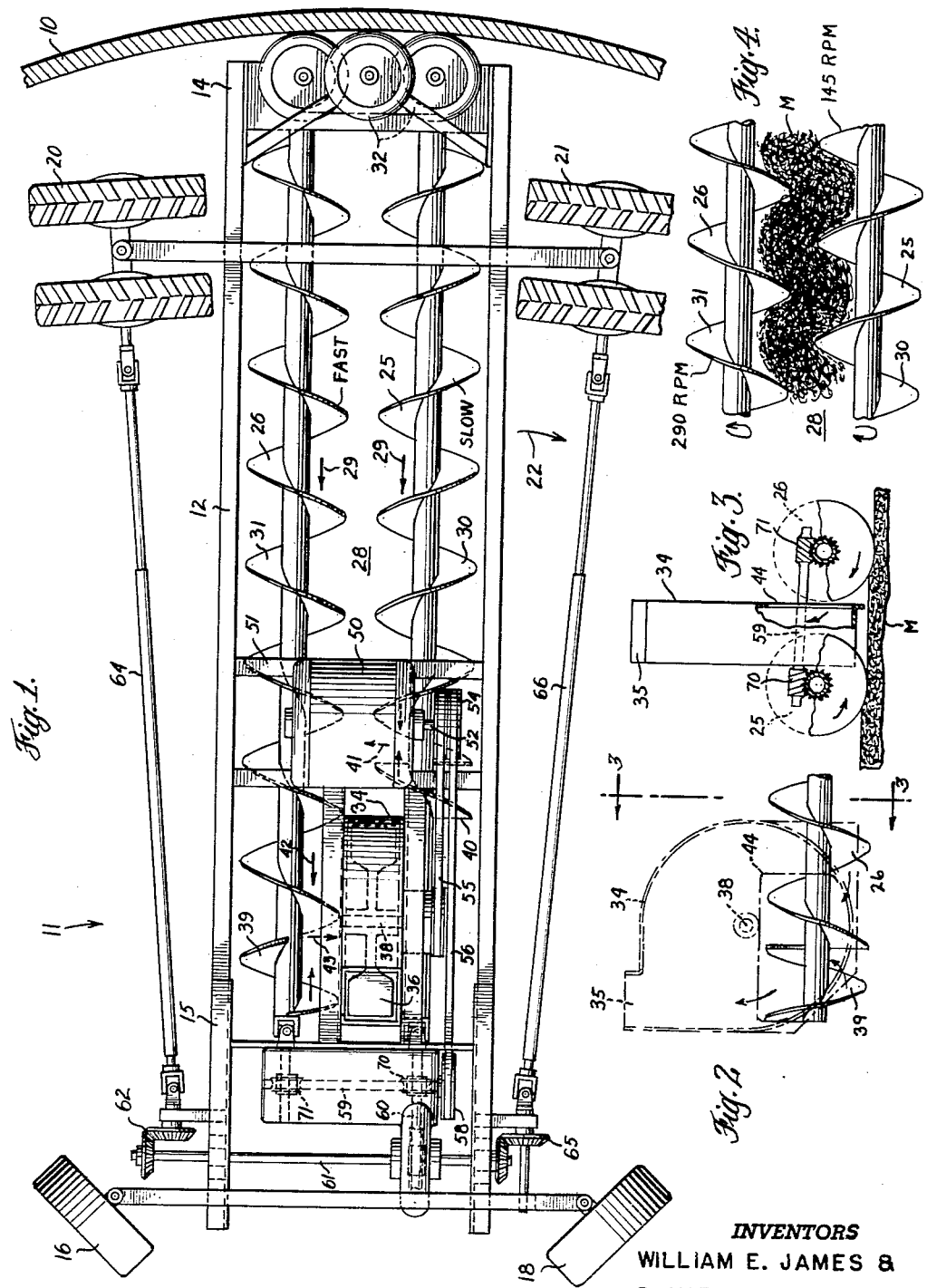

3,143,378
Patented Aug. 4, 1964

3,143,378
GATHERING DEVICE
William E. James, Ephrata, and Daniel C. Heitshu, Shippensburg, Pa., assignors to Sperry Rand Corporation, New Holland, Pa., a corporation of Delaware
Filed May 31, 1962, Ser. No. 198,818
3 Claims. (Cl. 302—56)

A conventional silo, comprises a tall tubular structure in which crop material is stored. The crop is deposited in the silo by blowing the material through a vertical pipe extending along the outside of the silo and having a spout projecting into the silo structure at the top thereof. The material falls within the silo and accumulates between the silo walls in a vertical cylindrical column. As the column of material builds up, the material in the structure becomes heavily compacted. In such condition, the material is preserved until ready for use.

Unloader devices have been provided for mechanically removing crop material from a silo. Some of these devices operate in the bottom of the silo to progressively remove layer after layer of material and to cause the column to gradually move downwardly to unloading means. Other unloaders have been provided which operate on top of the column of material, the unloader being either supported directly on the material itself or being suspended by a cable or other means from the top of the silo. Whether the unloader is a top or a bottom type, conventionally it operates to move material radially inwardly from the inside wall of the silo and toward the vertical center of the structure. From there, discharge means operates to convey the material from the silo.

In silo unloaders, it is common to provide two augers for removing material. These augers extend radially from adjacent the center of the silo to a point adjacent the silo wall. They are mounted on a frame which is rotated about the vertical center of the silo and the augers operate to remove the silage material a layer at a time. The two augers are located one directly in front of the other and in the same horizontal plane. The front auger rotates in one direction to cut away a layer of material and the back auger in an opposite direction to "back-stop" the front auger and assist in conveying material toward the silo center. Conventionally, a blower is located at the center of the silo to receive the delivered material and to discharge it through openings in the side wall of the silo.

It sometimes happens, that a chunk of crop material is pulled loose from the silage mass by the front auger. When such a chunk results it is conveyed in one piece by the cooperating augers and when it reaches the blower, plugging may result. If the blower is able to receive and discharge the chunk, it is nevertheless subjected to substantial wear and tear and excessive power is utilized.

One object of this invention is to provide a pair of augers for removing silage from a silo and cooperative so that if chunks of material are removed from the mass of silage, these chunks will be broken up before they are delivered to the unloader blower or other discharge means.

Another object of this invention is to provide a silo unloader having removing and conveying means so operated that material is shredded and broken up as it is conveyed whereby the nature of the material delivered to the discharge means is generally uniform whereby the discharge means will operate more efficiently and effectively.

A further object of this invention is to provide material gathering and conveying means having two conveyors operaitve in different planes whereby successive layers of material are removed and the work performed by one conveyor is commensurate with the work performed by the other conveyor.

A still further object of this invention is to provide a silo unloader of the character described having a pair of augers operative relative to each other in such a manner that the unloader has greater operational stability than available heretofore.

Other objects of this invention will be apparent hereinafter from the specification and from the recital in the appended claims.

In the drawings:

FIG. 1 is a fragmentary plan view and part section showing a silo unloader constructed according to this invention;

FIG. 2 is a diagrammatic side elevation of the blower unit for discharging material and showing the inner end of the rear auger which delivers material to the blower;

FIG. 3 is a section taken on line 3—3 of FIG. 2 looking in the direction of the arrows and diagrammatically showing the relative planes in which the two augers operate and the drive means for the augers; and FIG. 4 is a fragmentary plan view showing the two auger conveyors and material being conveyed therebetween.

Referring now to the drawing by numerals of references, and particularly to FIG. 1, 10 denotes the wall of a cylindrical silo adapted to contain crop material M (FIG. 3) on top of which is supported a silo unloader 11. The unloader has a rectangular frame 12 which extends radially relative to the vertical longitudinal axis of the silo 10. The frame 12 has an outer end 14 adjacent the silo wall 10 and an inner end 15 located adjacent the silo center. The frame 12 is supported on material M by a pair of caster wheels 16 and 18 located on opposite sides respectively of the inner end 15 of the frame 12 and pairs of drive wheels 20 and 21 located on opposite sides respectively of the outer end 14 of the frame. The drive wheels 20 and 21 rotate in a direction whereby the unloader travels or rotates in the direction indicated by the arrow 22.

For removing crop material from the silo 10, layer by layer, removing and conveying means is provided in the form of a pair of augers 25 and 26. Auger 25 is directly in front of auger 26, relative to the direction of rotation 22 of the unloader. The augers are suitably journalled and supported on the frame 12 and they extend side by side and parallel to each other. When viewed as shown in FIG. 3, the front auger 25 rotates in a counter-clockwise direction while the rear auger 26 rotates clockwise. Gathered crop material is deposited in the space 28 between the two augers and it is conveyed in the direction indicated by the arrows 29 in FIG. 1. The material is conveyed radially inwardly by the force on flights 30 and 31 of the respective augers and the reacting force urges the unloader in a radially outward direction whereby the unloader is continually urged into engagement with the silo wall 10. Wall wheels 32 are provided which are rotatable about vertical axes to permit free travel of the unloader relative to the silo wall.

Receiving and discharging means is provided on frame 12 and adjacent the silo center in the form of a blower 34 which extends in a vertical plane, having a discharge spout 35 extending upwardly. Blower 34 has a fan 36 rotatable about the axis of a shaft 38 extending transverse to the extension of augers 25 and 26. As shown best in FIG. 1, the auger 25 is of shorter axial length then the auger 26. The blower structure 34 is located alongside and in front of the terminal end 39 of the rear auger 26 and axially in front of the terminal end of the auger 25. The terminal end flights 40 of the auger 25 are broken as shown to exert a lateral feeding force on the material adjacent blower 34 as indicated by the arrow 41 to transfer material conveyed by the auger 25 toward the auger 26. Then auger 26 moves the material in the direction indicated by the arrow 42 to auger end 39 which is broken to exert a feeding force as indicated by arrow 43. Blower 34 has a side wall opening 44 to receive the delivered material and then the material is thrown and blown upwardly through spout 35 and through a discharge conduit not shown to an outlet opening in the silo wall.

All of the components of the unloader are driven from a single power means comprising a motor 50 mounted on cross braces 51 of the frame 12 and between the ends of the frame. Motor 50 has an output shaft 52 to which a double pulley 54 is connected which drives belts 55 and 56. Belt 55 is connected to the shaft 38 of the blower 35 to rotate it in a clockwise direction when viewed from the side shown in FIG. 2. Belt 56 is conected to a pulley 58 which rotates a drive shaft 59 connected through gearing 60 to a shaft 61 extending transversely of the frame 12. Shaft 61 operates through bevel gears 62 and power connection 64 to operate the drive wheels 20 and bevel gears 65 and power connection 66 to operate drive wheels 21. These drive connections are such that the wheels rotate at a very slow speed and the blower fan 36 is rotated at high speed.

The shaft 59 also provides the drive for the augers 25 and 26 as shown in FIGS. 1 and 3. A worm gear connection 70 is provided between the shaft 59 to the auger 25 and a worm gear connection 71 is provided to the auger 26. The pitch and threads of the gearing is such that the auger 26 is rotated at approximately twice the speed as the auger 25. Specifically, it has been found desirable to rotate the auger 25 at a speed in the vicinity of 145 r.p.m. and auger 26 at 290 r.p.m.

Both of the augers 25 and 26 are of the same configuration, having a flight pitch which is identical and the same diameter. The augers are mounted on the frame 12 in different horizontal planes, the front auger 25 being slightly vertically higher than the rear auger 26, FIG. 3. Thus, when the unloader is operated, the front auger operates to remove a thin layer of material from the silage mass M and the rear auger operates to remove the next lower layer. Suitable adjustment means is provided so that the augers can be set to remove approximately the same amount of material, such as a half inch layer each or a total of one inch per sweep. The front auger 25 delivers the material rearwardly and the rear auger operates to deliver the material forwardly. The flights on the front auger cut downwardly into the material while the rear auger flights cut and sweep upwardly. The removed material is deposited in the space 28 between the augers and as shown best in FIG. 4.

If the flights 30 or 31 on the respective augers engage and remove a chunk of material which is then deposited between the augers, the relative speeds of the augers will insure that the piece will be broken up or at least substantially disintegrated before it reaches blower 34. Since the auger 26 is rotating twice as fast as the auger 25, the flights 31 of the auger 26 have an axial component of movement relative to the flights 30 of the auger 25. This produces a beating and mixing action on the material as it is conveyed toward the blower 34. When the material reaches the blower 34, the agitation, shredding and breaking up provided by the different speeds of rotation of the augers, insures that the material will be in satisfactory condition for effective and efficient handling by the blower. Since chunks are eliminated the blower structure is protected against substantial and unusual loads thereby reducing wear and tear. The fact that the augers 25 and 26 operate in different planes, substantially equalizes the amount of gathering work done by the respective augers. By their counter operation, they equalize each other and give the machine greater operational stability. The overall design is such that the unloader operates smoother and lasts longer than similar unloaders of prior design.

Further, the location and structure of auger 25, auger 26 and blower 34 provides for conveyance and discharge of material with less power than required heretofore. As described, auger 25 is shorter than auger 26, the blower 34 being located generally in line with the space 28 between the augers. The housing of blower 34 is peripherally closed except for the spout opening 35 and the side walls of the blower are closed except for infeed opening 44. Flight section 40 of auger 25 is in reverse to the flights 30. This provides for the movement of material in the direction of arrow 41. Flight section 39 of auger 26 is also reverse to flights 31. This provides a feeding of material in the direction of arrow 43. Since the blower is peripherally closed and the infeed described is employed, the efficiency of fan 36 is much higher than when a peripheral opening is employed in the blower in register with space 28. With the present design, the fan blades travel along a smooth unbroken surface, no wall edges being presented between which material may wedge with a resultant consumption of a great deal of power.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention and the limits of the appended claims.

Having thus described our invention, what we claim is:

1. An improvement in a silo unloader positionable within a vertically extending silo for travel around the silo axis and having means for removing material from the top surface of a column of ensilage therein and for conveying such material toward said axis to means which discharges the material from the silo, the improvement residing in said removing and conveying means and comprising, in combination, a pair of radially extending augers located one directly in front of the other relative to the travel of the unloader, said augers having flights engageable with said ensilage top surface and cooperative to deliver material between the augers and toward said discharge means, and power means rotating said one auger at a given speed and said other auger at a different speed whereby there is relative axial movement of the flights of the respective augers and the material conveyed is subjected to a shredding action as it is conveyed.

2. An improvement in a silo unloader as recited in claim 1 wherein both of said augers are of the same diameter, said one auger having an axis spaced vertically relative to the axis of the other auger whereby the augers have peripheral portions operative over the same radial path and in different horizontal planes.

3. An improvement in a silo unloader positionable within a vertically extending silo for travel around the silo axis and having means for removing material from the top surface of a column of ensilage therein and for conveying such material radially inwardly toward said axis comprising, in combination, a pair of radially extending augers located one directly in front of the other relative to the travel of the unloader, said augers having flights engageable with said ensilage top surface and cooperative to deliver material between the augers and toward said silo axis, said augers extending parallel to each other and having a relatively narrow space between them to accommodate conveyed material, the flights of both augers being of substantially the same diameter and pitch and both augers having axial outer ends generally uniformly spaced from the silo, said one auger being of shorter axial length than the other auger, a blower located in front of the inner axial end of the other auger relative to the travel of the unloader and having a housing peripherally closed except for an upwardly extending discharge spout, said blower having a side wall infeed opening facing said inner axial end of said other auger and having a fan within said housing for discharging material through said spout, reverse flighting sections on the inner axial ends of both augers, the section on said one auger delivering material to said other auger and the section on said other auger delivering material to said blower and through said infeed opening, and power means rotating said one auger at one speed and in such direction that the flights thereon sweep downwardly into the material in the silo and rotating the other auger at a different speed and in an opposite direction whereby the flights sweep upwardly into the material.

References Cited in the file of this patent

UNITED STATES PATENTS

| | | |
|---|---|---|
| 2,615,594 | Clapp | Oct. 28, 1952 |
| 2,794,560 | Buschbom | June 4, 1957 |
| 2,869,743 | Williams | Jan. 20, 1959 |
| 2,995,260 | McCann | Aug. 8, 1961 |
| 3,079,016 | Dretzke | Feb. 26, 1963 |